Dec. 6, 1955    H. JANSSEN ET AL    2,725,747
SLIDE VALVE CONTROLLED DRY GAS METER
Filed Oct. 11, 1954

United States Patent Office 2,725,747
Patented Dec. 6, 1955

2,725,747

SLIDE VALVE CONTROLLED DRY GAS METER

Helmuth Janssen, Osnabruck, and Franz Rings, Nahne, near Osnabruck, Germany, assignors to G. Kromschröder Aktiengesellschaft, Osnabruck, Germany Application October 11, 1954, Serial No. 461,349

7 Claims. (Cl. 73—268)

This invention relates to a slide valve controlled dry gas meter with two mutually charged diaphragm systems, the diaphragm of which is held between an inner and an outer diaphragm shell. Up to now, the two diaphragm shells receiving the diaphragm between each other have been constructed of equal size. The two diaphragm systems are commonly arranged closely beside each other and are connected by means of a joint slide grate.

The invention has for its object to simplify the design of such a slide valve gas meter while maintaining the operation and decreasing the manufacturing cost.

According to the invention this object is accomplished thereby that the two outer diaphragm shells are connected with each other in sealing manner at the elevated parts of their rim which project over the edge of the inner diaphragm shells so that a main gas channel is formed which surrounds the inner diaphragm shells. The so formed main gas channel can be realized without any extra expense and tapped at any desired point. By simplifying the two diaphragm systems so as to form a closed body, besides the possibiilty of providing any desired arrangement of the slide valve housings relative to each other, the diametrical arrangement being preferred in this case, and subsequently the arrangement of a hollow body forming a communication between the main gas channel and the outlet socket of the meter being provided, there results still a number of advantageous structural possibilities.

An embodiment of the invention is shown in the drawings by way of example.

Figure 1:
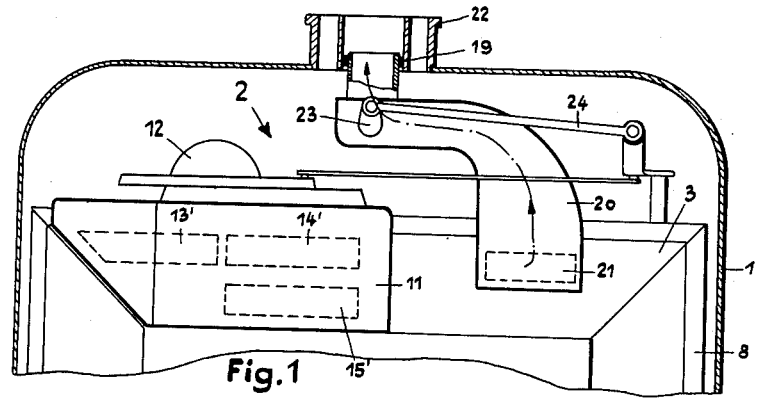
Fig. 1 shows the measuring gear of the gas meter in sectional elevation.
Figure 2:
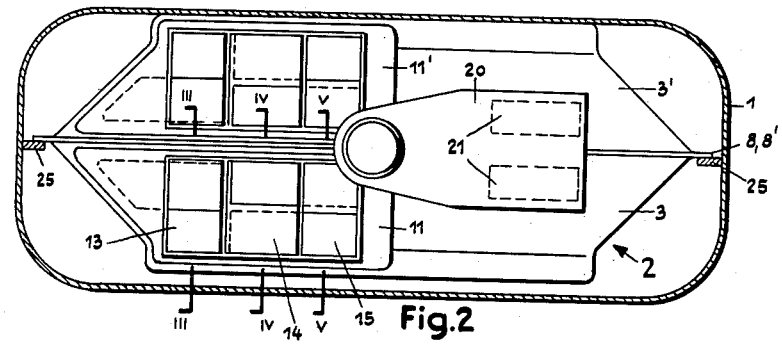
Fig. 2 is the sectional ground plan of the same measuring gear.
Figures 3, 4, 5:
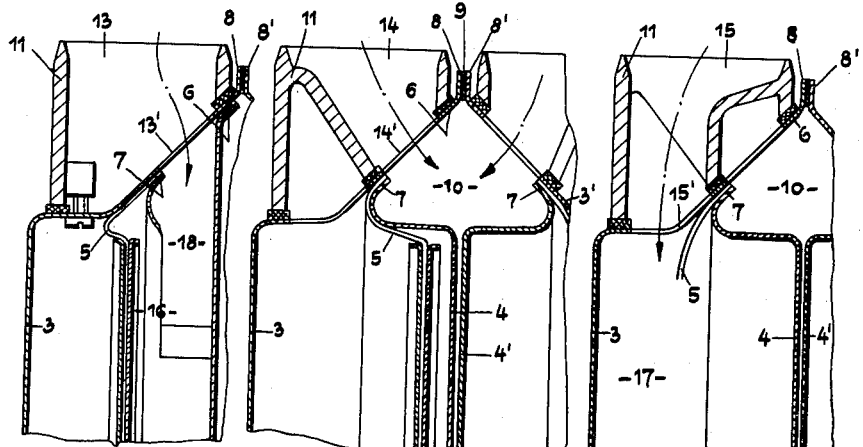
Figs. 3 to 5 show in enlarged scale partial sections of the measuring gear taken on the lines III, IV, V.

The measuring gear 2 built into the meter housing 1 comprises as usual two mutually charged diaphragm systems having two diaphragm chambers each. Each of these diaphragm systems consists of an outer diaphragm shell 3 or 3', an inner diaphragm shell 4 or 4' and a diaphragm 5 interposed between them. The outer diaphragm shell 3 or 3' has a larger dimension than the inner diaphragm shell 4, so that the inclined elevated parts of the rim 6 of the outer diaphragm shell 3 or 3' project over the rim 7 of the inner diaphragm shell 4 holding the diaphragm 5. The outer diaphragm shells 3, 3' have a flange 8 and 8'. The two outer diaphragm systems 3, 3' lay with the rims of their flanges 8, 8' on each other and are connected under interposition of the gasket 9. The inner diaphragm shells 4, 4' which are so arranged that their bottom parts are in contact with each other are located in the inner part of the body which is formed by the outer diaphragm shells 3, 3' so that they are invisible from the outside. A main gas channel having a triangular cross section at this point which surrounds the inner diaphragm shells 4, 4' is formed by the inclined elevated parts of the rim 6. A separate slide housing 11 and 11' for each of the two diaphragm systems is attached from the outside to the inclined face of the rim 6 of the outer diaphragm shell 3 or 3'. The cross section of these slide housings are adapted to the slope of the outer diaphragm shell 3 or 3' and therefore being substantially of triangular shape at this point.

The channels 13, 14, 15 of the slide housing 11 are in known manner controlled by a three-ported slide valve 12 and are in communication with the inner diaphragm chamber 16, the main gas channel 10 or the outer diaphragm chamber 17 respectively through passages 13, 14, 15. A by-passing chamber 18 which is separated from the main gas channel 10 and falls into the passage 13' is provided beneath the channel 13 and serves for the communication of the channel 13 with the inner diaphragm chamber 16.

The mentioned arrangement has the advantage that the slide valve housing 11 can be attached completely without tension to the diaphragm system belonging thereto. In contrast to the known manner of construction, two single slide valve housings 11, 11' are provided which can be attached separately and which are mounted independently of each other. The communication of the gas channel 10 with the connection socket 19 of the meter is established by a hollow body 20 fitted on to the outer diaphragm shells 3, 3'; the hollow body being connected to the main gas channel 10 through the passages 21.

The connection socket 19 is arranged concentrically relative to an outer connection socket 22 which leads into the space of the housing of the gas meter. This concentric arrangement of the connecting sockets 19, 22 provides in conjunction with a special pipe adapter for a particularly simple and reasonable installation of the gas meter. It is of course understood that the invention is not limited to gas meters having concentrically arranged connecting sockets of the type referred to above.

The hollow body 20 can be reasonably used for the bearing of the crank shaft 23 of the common slide valve control mechanism 24. A web 25 has been disposed in the housing 1 of the gas meter to secure the measuring gear 2 in its position. The rims of the flanges 8, 8' which are connected with each other are supported by these webs when the outer face of the diaphragm shell 3' contacts the wall of the housing 1. By this type of support it is unnecessary to fasten the measuring gear 2 in the housing 1 by means of threaded bolts.

We claim:

1. In a slide valve controlled dry gas meter having two diaphragm systems, one outer and one inner diahpragm shell for each of the diaphragm systems, one diaphragm fixed between one inner and one outer diaphragm shell the bottoms of the inner shells of the two diaphragm systems being turned towards each other, the outer diaphragm shells provided with rims which project over the inner diaphgram shells, said rims of the outer diaphragm shells connected with each other in sealing manner and together with the inner diaphragm shells forming an annular main gas channel.

2. In a slide valve controlled dry gas meter having two diaphragm systems, one outer and one inner diaphragm shell for each of the diaphragm systems, one diaphragm fixed between one inner and one outer diaphragm shell the bottoms of the inner shells of the two diaphragm systems being turned towards each other, the outer diaphragm shells provided with inclined rims which project in roof-like manner over the inner diaphragm shells, straight flanges at the inclined rims of the outer diaphragm shells, said flanges being connected in sealing manner with each other, said inclined rims of the outer diaphragm shells forming a main gas channel of triangular cross section which surrounds the inner diaphragm shells.

3. In a slide valve controlled dry gas meter according to claim 2, slide valve housings provided with channels for each of the diaphragm systems, said slide valve housings having substantially a triangular cross section which is adapted to the inclined rims of the outer diaphragm shells, said slide valve housings mounted on the inclined rims of the outer diaphragm shells, said inclined rims provided with passages assigned to the channels, said passages located inside said slide valve housings.

4. In a slide valve controlled dry gas meter having a connection socket and two diaphragm systems, one outer and one inner diaphragm shell for each of the diaphragm systems, one diaphragm fixed between one inner and one outer diaphragm shell the bottoms of the inner shells of the two diaphragm systems being turned towards each other, the outer diaphragm shells provided with rims which project over the inner diaphragm shells, said rims of the outer diaphragm shells connected with each other in sealing manner and together with the inner diaphragm shells forming an annular main gas channel, a hollow body mounted in sealing manner on the rims of the outer diaphragm shells, said hollow body forming a channel which is in communication with said main gas channel, said hollow body connected to said connection socket.

5. In a slide valve controlled dry gas meter according to claim 4, with a crank shaft for the control of the slide valve, said crank shaft borne in said hollow body.

6. In a slide valve controlled dry gas meter according to claim 4, a gas meter housing, an inner and an outer connection socket, both of said connection sockets disposed concentrically to each other in the central axis of the gas meter housing, said hollow body connected to the inner connection sockets.

7. In a slide valve controlled dry gas meter, a gas meter housing, a measuring gear, said measuring gear comprising two inner and two outer diaphragm shells, the outer diaphragm shells provided with rims which project over the inner diaphragm shells, said rims connected with each other, a web mounted in the gas meter housing in parallel to said rims, said measuring gear so inserted into the gas meter housing that one of the outer diaphragm shells contacts the inner face of the gas meter housing while the rim of the outer diaphragm shell is in contact with said web disposed inside the gas meter housing.

References Cited in the file of this patent

FOREIGN PATENTS

| | | |
|---|---|---|
| 546,341 | Germany | Mar. 12, 1932 |
| 218,915 | Switzerland | Apr. 16, 1942 |